US012592347B2

(12) United States Patent
Nagahara et al.

(10) Patent No.: US 12,592,347 B2
(45) Date of Patent: Mar. 31, 2026

(54) ELECTROLYTIC CAPACITOR INCLUDING AN ENLARGED SURFACE LAYER AND A DIELECTRIC OXIDE FILM FORMED ON THE ENLARGED SURFACE LAYER

(71) Applicant: Nippon Chemi-Con Corporation, Tokyo (JP)

(72) Inventors: Kazuhiro Nagahara, Tokyo (JP); Tatsuru Hatae, Kanagawa (JP); Kazuya Koseki, Kanagawa (JP); Atsushi Yoshida, Fukushima (JP); Makoto Tominaga, Fukushima (JP); Riho Gumilar Maeda, Fukushima (JP)

(73) Assignee: Nippon Chemi-Con Corporation, Tokyo (JP)

( * ) Notice: Subject to any disclaimer, the term of this patent is extended or adjusted under 35 U.S.C. 154(b) by 26 days.

(21) Appl. No.: 18/276,029

(22) PCT Filed: Jan. 26, 2022

(86) PCT No.: PCT/JP2022/002937
§ 371 (c)(1),
(2) Date: Aug. 5, 2023

(87) PCT Pub. No.: WO2022/168711
PCT Pub. Date: Aug. 11, 2022

(65) Prior Publication Data
US 2024/0304395 A1     Sep. 12, 2024

(30) Foreign Application Priority Data
Feb. 8, 2021     (JP) ................................. 2021-018411

(51) Int. Cl.
*H01G 9/042*     (2006.01)
*H01G 9/055*     (2006.01)
*H01G 9/145*     (2006.01)

(52) U.S. Cl.
CPC .......... *H01G 9/0425* (2013.01); *H01G 9/055* (2013.01); *H01G 9/145* (2013.01)

(58) Field of Classification Search
None
See application file for complete search history.

(56) References Cited

U.S. PATENT DOCUMENTS

| | | | |
|---|---|---|---|
| 2006/0171102 A1* | 8/2006 | Ro | H01G 9/045 |
| | | | 361/516 |
| 2007/0211413 A1 | 9/2007 | Fife et al. | |
| 2021/0193395 A1* | 6/2021 | Koseki | H01G 9/042 |

FOREIGN PATENT DOCUMENTS

| | | | | |
|---|---|---|---|---|
| DE | 102007011361 A1 | 10/2007 | | |
| JP | 2005-223197 A | 8/2005 | | |
| JP | 2006-080111 A | 3/2006 | | |
| JP | 2008-227022 A | 9/2008 | | |
| JP | 2014-181368 A | 9/2014 | | |
| WO | WO-2019240041 A1 * | 12/2019 | .......... | H01G 9/0029 |
| WO | WO 2020/059609 A1 | 3/2020 | | |

OTHER PUBLICATIONS

Translation—JP 20052231974A.*
International Search Report from International Patent Application No. PCT/JP2022/002937, Apr. 12, 2022.
Office Action issued Dec. 3, 2024, in Japanese Patent Application No. 2021-018411.
Jens Both, "The Modern Era of Aluminum Electrolytic Capacitors", IEEE Electrical Insulation Magazine, IEEE, USA, vol. 31, No. 4, pp. 24-34, Jul. 1, 2015.
Extended European Search Report and European Search Opinion issued Apr. 11, 2025, in European Patent Application No. 22749585.0.
Office Action issued Mar. 28, 2025, in Korean Patent Application No. 10-2023-7025330.
Office Action issued Jul. 1, 2025, in Japanese Patent Application No. 2021-018411.
Office Action issued Feb. 12, 2026, in European Patent Application No. 22749585.0.

* cited by examiner

*Primary Examiner* — Eric W Thomas
(74) *Attorney, Agent, or Firm* — Potomac Law Group, PLLC

(57) ABSTRACT
The present disclosure provides an electrolytic capacitor for middle or high voltage application of 160 V or more, which can suppress the total amount of gas generated inside the electrolytic capacitor. An electrolytic capacitor includes anode foil on which dielectric oxide film is formed, and a cathode body. The cathode body includes cathode foil formed of valve action metal and a carbon layer formed on the cathode foil. The anode foil and the cathode body have capacitance so that when capacitance X of the anode foil per unit area is 1, ratio of capacitance Y of the cathode body per the same unit area is equal to or more than 10.

4 Claims, 3 Drawing Sheets

ELECTROLYTIC CAPACITOR INCLUDING AN ENLARGED SURFACE LAYER AND A DIELECTRIC OXIDE FILM FORMED ON THE ENLARGED SURFACE LAYER

FIELD OF INVENTION

The present disclosure relates to an electrolytic capacitor.

BACKGROUND

Electrolytic capacitors are passive elements that stores and discharges electric charges according to capacitance. The electrolytic capacitor is formed by housing a capacitor element impregnated with electrolytic solution in an outer casing, sealing an opening of the outer casing by a sealing body, and drawing out a lead terminal from the sealing body. The capacitor element is formed by anode foil that is foil made of valve action metal on which dielectric oxide film is formed and cathode foil that is foil made of the same or different metal facing each other, and a separator via the anode foil and the cathode foil.

The electrolytic solution intervenes between the anode foil and the cathode foil, closely contacts with an uneven surface of the anode foil, and acts as a true cathode. The electrolytic capacitor can be regarded as a series capacitor in which capacitance of the anode foil and cathode foil synthesized by series connection. However, when the capacitance of the cathode foil is sufficiently larger than the capacitance of the anode foil, the capacitance C [F] of the electrolytic capacitor can be approximated by the following formula 1, in which S [m²] is the effective area of the anode foil facing the cathode foil, d [m] is the thickness of the dielectric oxide film formed on the surface of the anode foil, ε is the dielectric constant of the dielectric oxide film, and the vacuum permittivity is $8.85 \times 10^{-12}$ [F/m].

$$C = 8.854 \times 10^{-12} \times \varepsilon \cdot S/d \qquad \text{(Formula 1)}$$

The withstand voltage of 160 V or more may be required for the electrolytic capacitor, such as for in-vehicle application and power application in electric vehicles. The thickness d of the dielectric oxide film of the anode foil largely affects the withstand voltage of the electrolytic capacitor. Therefore, the electrolytic capacitor that can withstand the middle or high voltage of 160 V or more requires thick dielectric oxide film. However, thickening the dielectric oxide film means increasing the thickness d of the formula 1, which reduces the capacitance C. Accordingly, the electrolytic capacitor for middle or high voltage application of 160 V or more includes an enlarged surface layer formed by the anode foil with many tunnel-shaped pits. Otherwise, the electrolytic capacitor includes an enlarged surface layer partially or fully with tunnel-shaped pits that penetrate the anode foil on said anode foil. According to such surface enlarging technique, the electrolytic capacitor for middle or high voltage application of 160 V or more increases the surface area of the anode foil while maintaining the thickness of the dielectric oxide film.

PRIOR ART DOCUMENT

Patent Document

Patent Document 1: JP2014-181368

SUMMARY OF INVENTION

Problems to be Solved by Invention

However, gas is generated inside the electrolytic capacitor for various phenomena. For example, hydrogen gas is generated at the anode side by hydration degradation of valve action metal when the dielectric oxide film dissolves and moisture in the electrolytic solution and the valve action metal contact with each other. Hydrogen gas is also generated at the cathode side on an interface of the foil. When the generation amount of gas inside the electrolytic capacitor increases, swelling, opening, and leakage of the outer casing may occur.

Meanwhile, in recent years, larger capacitance is demanded for the electrolytic capacitor for middle or high voltage application of 160 V or more. In other word, thinning the dielectric oxide film while maintaining the withstand voltage is demanded for the electrolytic capacitor. However, the withstand voltage decreases according to the reduction in thickness of the dielectric oxide film, and leakage current increases. When the leakage current is produced, oxygen ions ($O^{2-}$) is produced by chemical reaction of hydroxide ions (OH—) present due to dissociation of water in the electrolytic solution, aluminum ions ($Al^{3+}$) is produced by anode reaction of aluminum of the anode foil, and the oxygen ions and the aluminum ions react to form the dielectric oxide film and produce electrons. That is, increase of the leakage current significantly increases the production amount of electrons. Note that, at this time, protons ($H^+$) increase at an interface between the electrolytic solution and the dielectric oxide film on the anode foil.

The electrons increased at the anode-foil side moves to the cathode foil along with the increase in the leakage current. At the cathode-foil side, cathode reaction occurs, in which the protons present near the cathode of foil in the electrolytic solution receive the electrons and atomic hydrogen ($H_{ad}$) is generated. When two atomic hydrogen combine, molecular hydrogen ($H_2$ gas) is generated. Here, the reaction amount cathode reaction producing the molecular hydrogen becomes larger proportionally to the reaction mount of the anode reaction corresponding to the leakage current of the capacitor, according to Faraday's law. That is, if the dielectric oxide film of the anode foil is thinned to increase the capacitance C, there is a problem that the internal pressure of the capacitor increases in a short time due to the increase in the generation amount of the molecular hydrogen in association with the increase in the leakage current, reducing the lifetime of the capacitor.

Therefore, it is considered to add gas absorption agent and gas control agent such as nitro compounds to the electrolytic solution of the electrolytic capacitor. However, the nitro compound tends to reduce the withstand voltage of the electrolytic capacitor, and it is desirable to reduce the addition amount for the electrolytic capacitor requiring middle or high voltage of 160 V or more.

The present disclosure has been proposed to solve the above problems, and an object of the present disclosure is to provide an electrolytic capacitor for middle or high voltage application of 160 V or more, which can suppress the total amount of gas generated inside the electrolytic capacitor.

Means to Solve the Problem

Firstly, the capacity appearance rate is defined. The capacity appearance rate is ratio of the capacitance of the electrolytic capacitor relative to the capacitance at the anode side. That is, the capacity appearance rate is the percentage of ratio obtained by dividing the capacitance at the anode side by the synthesized capacitance, which is the capacitance The synthesized capacitance can be obtained by dividing the product of the capacitance at the anode side and the cathode side by the sum of the capacitance at the anode side and the cathode side. Therefore, the capacity appearance rate is expressed by the following formula 2.

(Formula 2)

$$\text{Capacity Appearance Rate (\%)} = \frac{\text{Capacitance at Anode Side}}{\text{Capacitance at Anode Side} + \text{Capacitance at Cathode Side}} \times 100$$

As indicated in the formula 2, when the capacitance at the anode side is large, the effect of the cathode side relative to the capacity appearance rate becomes large. In contrast, when the capacitance at the anode side is small, the effect of the cathode side relative to the capacity appearance rate becomes small.

Here, in the field of the electrolytic capacitor, the capacitance per unit area of the anode foil of the electrolytic capacitor for middle or high voltage application of 160 V or more is larger than that of the anode foil of the electrolytic capacitor for low voltage application. In the electrolytic capacitor for middle or high voltage application, the difference between the capacitance at the anode side and the cathode side is large. This is because, in the electrolytic capacitor for middle or high voltage application, the dielectric oxide film on the surface of the enlarged surface layer is thick to ensure the withstand voltage, From the viewpoint of improving the capacity appearance rate, in the electrolytic capacitor for low voltage application with large capacitance at the anode side, it is effective to increase the capacity at the cathode side to increase the capacity appearance rate. However, in the electrolytic capacitor for middle or high voltage application with small capacitance at the anode side or in the electrolytic capacitor in which the capacitance at the cathode side is one or more digit larger than the capacitance at the anode side, the effect of the capacity appearance rate is small even if the capacitance at the cathode side is increased.

In other word, when the capacitance at the anode side is large, the capacity appearance rate is increased by making the capacitance at the cathode side larger. That is, in the electrolytic capacitor for low voltage application of less than 160 V with large capacitance at the anode side, there is a reason to make the capacitance at the cathode side larger. In contrast, when the capacitance at the anode side is small, the contribution of the capacity appearance rate of the capacitance at the cathode side is small, and the capacity appearance rate is not affected by the large capacitance at the cathode side. That is, in the electrolytic capacitor for middle or high voltage application of 160 V or more with small capacitance at the anode side, there is no reason to make the capacitance at the cathode side larger.

In the capacitor for middle or high application in which the effect of the capacity appearance rate is small even if the capacitance at the cathode side is improved, the capacitance of the cathode foil is not improved in view of a number of processes increase by using carbon material. However, as a result of keen research of the inventors, it was found that, in the electrolytic capacitor for middle or high voltage application of 160 V or more, the total amount of the gas generated in the electrolytic capacitor is suppressed when a carbon layer is formed on the cathode foil and the capacitance at the cathode side is 10 times larger than the capacitance at the anode side.

The present disclosure is made by the inventors who found said discovery, and to address the above problems, an electrolytic capacitor of the present disclosure is an electrolytic capacitor comprising: anode foil on which dielectric oxide film is formed and a cathode body, in which the cathode body includes cathode foil formed of valve action metal and a carbon layer formed on the cathode foil, and the anode foil and the cathode body have capacitance so that when capacitance X of the anode foil per unit area is 1, ratio of capacitance Y of the cathode body per the same unit area is equal to or more than 10.

The anode foil and the cathode body have the capacitance so that when capacitance X of the anode foil per unit area is 1, the ratio of the capacitance Y of the cathode body per the same unit area is more than 14.

The anode foil may include an enlarged surface layer formed on a surface of the anode foil, and the dielectric oxide film formed on a surface of the enlarged surface layer with thickness of 200 nm or more.

The anode foil may have the capacitance X of 3.5 $\mu$F/cm$^2$.

The electrolytic capacitor may be for middle or high voltage application of 160 V or more.

Effect of Invention

According to the present disclosure, the generation amount of gas inside the electrolytic capacitor can be suppresses even for the electrolytic capacitor for middle or high voltage application.

EMBODIMENTS (Electrolytic Capacitor)

Figure 1:
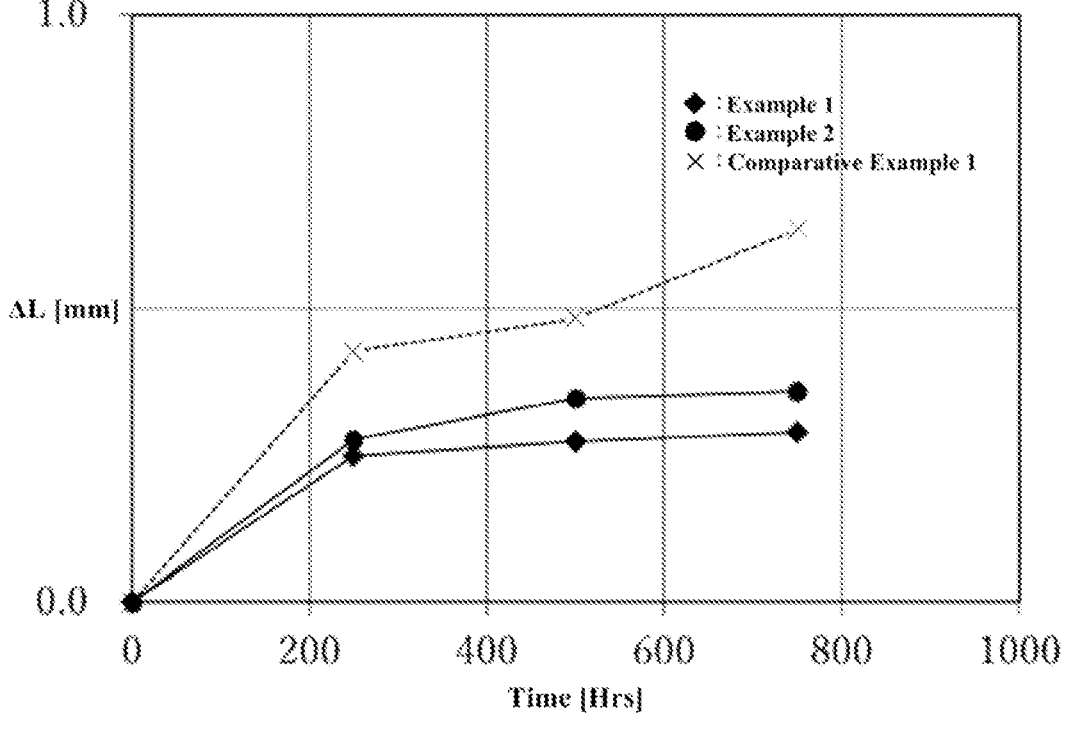
FIG. 1 is a graph indicating swell amount of electrolytic capacitors of the examples 1 and 2, and the comparative example 1.

An electrode body and an electrolytic capacitor using said electrode body according to the embodiment of the present disclosure will be described. The electrolytic capacitor is a passive element that stores and discharges electric charge according to the capacitance. This electrolytic capacitor has a wound-type or laminated-type capacitor element. The capacitor element is formed by facing anode foil which has dielectric oxide film formed on surface thereof, and a cathode body via a separator, and then impregnating them with electrolytic solution. The electrolytic solution closely contacts with an uneven surface of the dielectric oxide film of the anode foil and acts as a true cathode. Note that the electrolytic solution may be solidified into gel.

(Cathode Body)

The cathode body includes cathode foil formed by elongating valve action metal as a current collector. Natural oxide film or chemical conversion film is formed on a surface of the cathode foil. The oxide film is naturally or intentionally formed. The natural oxide film is formed when the cathode foil reacts with oxygen in the air, and the chemical conversion film is oxide film intentionally formed by chemical conversion treatment of applying voltage in solution without halogen ions such as aqueous solution of adipic acid, boric acid, or phosphoric acid. When the valve action metal is aluminum foil, the oxide film is aluminum oxide.

A carbon layer mainly including carbon material is formed on a surface of the cathode foil. That is, the cathode body includes the oxide film that is an insulation layer on the cathode foil that is the current collector, and the carbon layer on the oxide film. Furthermore, the carbon layer is positioned on the outermost surface of the cathode body. It is preferable that the carbon layer adheres to the cathode foil so that the carbon layer does not peel off from the cathode foil by impact. To improve the adhesion of the carbon layer and the cathode foil, it is preferable to form an enlarged surface layer in the surface of the cathode foil and form the carbon layer on the enlarged surface layer. Furthermore, to improve the adhesion of the carbon layer and the cathode foil, it is preferable to press the cathode body formed by the carbon layer and the cathode foil.

The cathode body is described later. The valve acting metal forming the cathode foil is aluminum, tantalum, niobium, titanium, hafnium, zirconium, zinc, tungsten, bismuth, and antimony, etc. The purity of the cathode foil is desirably about 99% or more, and impurities such as silicon, iron, copper, magnesium, and zinc may be included. For example, aluminum material with a temper designation of H defined in JIS standard H0001, a so-called H material, or aluminum material with a temper designation of O defined in JIS standard H0001, a so-called O material, may be used as the cathode foil.

The enlarged surface layer is formed by electrolytic etching, chemical etching, or sandblasting, and the like, or formed by vapor-depositing or sintering metal particles and the like, on a foil body. The electrolytic etching may be AC etching. For example, in the AC etching process, the cathode foil is immersed in aqueous acidic solution in which halogen ions are present, such as hydrochloric acid, and AC current is applied. Furthermore, in the chemical etching, the metal foil is immersed in acidic solution or alkaline solution. That is, the enlarged surface layer is a region where spongy etching pits are formed or a region with porous structure formed by air gaps between dense powder. Note that the etching pit may be tunnel-shaped etching pit formed by AC etching or may be formed so that the tunnel-shaped etching pit penetrates the cathode foil.

The carbon material included in the carbon layer may be activated carbon, graphite, carbon black, carbon nanohorn, and fibrous carbon. Source material for the activated carbon is natural plant tissue such as coconut shell, synthetic resin such as phenol, and activated carbon made from fossil fuel such as coal, coke, and pitch. The graphite may be natural graphite, artificial graphite, and graphitized Ketjen black, etc. The carbon black may be Ketjen black, acetylene black, channel black, and thermal black, etc. The fibrous carbon may be carbon nanotube (hereinafter, CNT) and carbon nanofiber (hereinafter, CNF), etc.

In particular, the carbon material included in the carbon layer is preferably carbon black that is spherical carbon. When the enlarged surface layer formed on the surface of the cathode foil is the etching pit, by using carbon black with the diameter smaller than the opening diameter of the etching pit, carbon black can easily enter deeper into the etching pit, and the carbon layer adheres to the cathode foil.

Two or more kinds of the carbon material may be mixed and included in the carbon layer. For example, flake or vein graphite and carbon black that is spherical carbon are suitable for the carbon material included in the carbon layer. It is preferable that the flake or vein graphite has an aspect ratio between short and long diameters of 1:5 to 1:100. The average primary diameter of the carbon black that is the spherical carbon is preferably 100 nm or less. When the carbon layer including this combination of the carbon material is laminated on the cathode foil, it is easy for carbon black to be rubbed into pores of the enlarged surface layer by graphite. The graphite easily deforms along the uneven surface of the enlarged surface layer and is easily laminated on the uneven surface. Accordingly, the graphite acts as a pressing lid that presses and holds the spherical carbon that has been rubbed into the pores. Thus, the adhesion and fixity of the carbon layer and the cathode foil are improved.

Furthermore, since $\pi$-electrons are delocalized and the specific surface area is large, activated carbon and fibrous carbon may be added to the carbon layer together with carbon black that is the spherical carbon or together with flake or vein graphite and carbon black that is spherical carbon.

The formation method of the carbon layer on the cathode foil may be vacuum vapor-deposition, sputtering, ion plating, CVD, application, electrolytic plating, or electroless plating, etc. In a case of the application, the carbon material is dispersed in a dispersion solvent to form a slurry, and the slurry is applied and dried on the cathode foil by slurry casting, doctor blading, or spray spraying, etc. In a case of the vapor-deposition, the carbon material is evaporated by electrical heating in vacuum or is evaporated by electron beam irradiation in vacuum, and film of the carbon material is formed on the cathode foil. Furthermore, in the case of the sputtering, the cathode foil and a target formed of the carbon material are placed in a vacuum container, inert gas is introduced into the vacuum container, and voltage is applied to bombard the target with the plasma inert gas, so that particles of carbon material beaten out from the target is deposited on the cathode foil.

After laminating the carbon layer and the cathode foil, it is preferable to pressure-weld the carbon layer and the cathode foil by press processing. For example, in the press processing, the cathode body formed by the carbon layer and the cathode foil is sandwiched by a press roller, and press linear pressure is applied. The press pressure is desirably about 0.01 to 100 t/cm. If the carbon layer and the cathode body is pressure-welded, the adhesion and fixity of the carbon layer and the cathode foil are further improved. Although the pressure-welded structure produced in an interface of the cathode foil is not particularly limited, the reason why the adhesion and fixity of the carbon layer and the cathode foil are improved is because the carbon material is pressed into the pores of the enlarged surface layer and is deformed along the uneven surface of the enlarged surface layer by the press processing. In particular, carbon black that is the spherical carbon is rubbed into the pores of the enlarged surface layer by graphite which received the pressing pressure, and the graphite is easily deformed along and laminated on the uneven surface of the enlarged surface layer.

Note that the carbon material may be subjected to pore forming treatment such as activation treatment and opening treatment. Conventionally known activation treatment such as gas activation or chemical activation can be used for the pore formation treatment. Gas used in the gas activation may be water vapor, air, carbon monoxide, carbon dioxide, hydrogen chloride, oxygen, or gas consisting of a mixture thereof. Furthermore, the chemical agent used in the chemical activation may be alkali metal hydroxides such as sodium hydroxide and potassium hydroxide, alkaline earth metal hydroxides such as calcium hydroxide, inorganic acid such as boric acid, phosphoric acid, sulfuric acid, and hydrochloric acid, or inorganic salt such as zinc chloride. During this activation treatment, heat treatment is performed as necessary.

(Anode Foil)

The anode foil is a long foil body formed of valve action metal. The purity of the anode foil is preferably about 99.9% or more. The anode foil is formed by forming an enlarged surface layer on the elongated foil, and forming the dielectric oxide film is formed a surface of the enlarged surface layer. The enlarged surface layer is designed for middle or high voltage application of 160 V or more, and includes a number of tunnel-shaped etching pits dug from the surface of the foil in the depth direction. To cope with higher capacity in the middle or high voltage application of 160 V or more, the tunnel-shaped etching pits may be formed to penetrate the anode foil. Otherwise, the enlarged surface layer is formed by sintering powder of the valve action metal, or vapor-depositing film of metal particles or the like on the foil to apply the film.

The dielectric oxide film formed on the anode foil is typically oxide film formed on a surface layer of the anode foil, and when the anode foil is formed of aluminum, it is an aluminum oxide layer obtained by oxidizing a porous structural region. This dielectric oxide film is formed by chemical conversion treatment in which voltage is applied in solution without halogen ions such as aqueous solution of ammonium borate, ammonium phosphate, ammonium adipate, or combinations thereof. The dielectric oxide film with the thickness of 200 nm or more can contribute to the withstand voltage of the electrolytic capacitor for middle or high voltage application of 160 V or more.

(Capacitance Ratio of Anode Foil to Cathode Body) Here, in this electrolytic capacitor, the capacitance at the cathode side is generated by the electric double layer action occurred at the interface between the electrolytic solution and the cathode body, and the capacitance at the anode side is generated by the dielectric polarization action. The anode foil in the electrolytic middle or high voltage application generates the capacitance at the anode side of 3.5 $\mu F/cm^2$.

In such an electrolytic capacitor, the anode foil and the cathode body are adjusted so that when the capacitance X at the anode side of the anode foil per unit area is 1, the capacitance Y at the cathode side of the cathode body per the same unit area is 10 or more, that is, X:Y=1:10 or more. When the capacitance Y at the cathode side is equal to or more than 10 times the capacitance X at the anode side per same unit area and the cathode body includes the carbon layer, it was found that the total amount of gas generated inside the electrolytic capacitor for middle or high voltage application can be suppressed.

Note that the adjustment method of the capacitance may be, for example, thickness adjustment of the dielectric oxide film and surface area adjustment of the enlarged surface layer by etching, however, the method is not limited and may be any commonly known method.

(Electrolytic Solution)

The electrolytic solution is mixed solution in which a solute is dissolved in a solvent and additives are added as necessary. The solvent is preferably ethylene glycol. When the solvent is ethylene glycol, the withstand voltage of the electrolytic capacitor is improved, and the electrolytic capacitor becomes suitable for middle or high voltage application of 160 v or more. However, the solvent may be either of a protic organic polar solvent or an aprotic organic polar solvent if the required withstand voltage can be obtained by surface enlargement treatment or chemical conversion treatment to the anode foil. Typical protic organic polar solvent includes monohydric alcohol, polyhydric alcohol, and oxy-alcohol compounds. Typical aprotic organic polar solvent includes sulfone-based, amide-based, lactones, cyclic amide-based, nitrile-based, and sulfoxide-based solvents.

A solute contained in the electrolytic solution contains anionic and cationic components, and is typically an organic acid or a salt thereof, an inorganic acid or a salt thereof, or a composite compound of the organic acid and the inorganic acid or a salt thereof with an ion dissociative property thereof, and is used alone or in combination of two or more. Acid that is the anion and base that is the cation may be separately added to the electrolytic solution as solute components.

Furthermore, other additives may be added to the electrolytic solution. Additives may be polyethylene glycol, complex compounds of boric acid and polysaccharides (mannit, sorbit, etc.), complex compounds of boric acid and polyhydric alcohol, borate esters, nitro compounds, phosphate esters, and colloidal silica, etc. These may be used in single or in combination of two or more. The nitro compound may be o-nitrobenzoic acid, m-nitrobenzoic acid, p-nitrobenzoic acid, o-nitrophenol, m-nitrophenol, p-nitrophenol, p-nitrobenzene, o-nitrobenzene, and m-nitrobenzene. The nitro compound has hydrogen gas absorption action.

(Separator)

The separator is interposed between the anode foil and the cathode body and holds the electrolytic solution in order to prevent short circuit between the anode foil and the cathode body. The separator may be cellulose such as kraft, Manila hemp, esparto, hemp, rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, polyamide resin such as aliphatic polyamides, semi-aromatic polyamides, and fully aromatic polyamides, polyimide resin, polyethylene resin, polypropylene resin, trimethylpentene resin, polyphenylene sulfide resin, acrylic resin, and the like, and these resin may be used in single or in combination and may be mixed and used with cellulose.

EXAMPLES

Hereinafter, the present disclosure will be described in more detail based on examples. Note that the present disclosure is not limited to the following examples.

Examples 1 and 2

Example 1

An electrolytic capacitor of the example 1 was produced for high voltage application in cylindrical shape of 30 mm in diameter and 60 nm in height and with constant voltage of 450 V. Band-shaped aluminum foil was used as the cathode foil. AC etching was performed on the aluminum foil to form enlarged surface layers formed by spongy etching pits on both surface of the foil. In the AC etching process, the cathode foil was immersed in acidic aqueous solution with hydrochloric acid having liquid temperature of 25° C. and percent by weight of 8 wt % as a main electrolyte, and current with alternating current of 10 Hz and current density of 0.14 A/cm² was applied to the substrate for about 5 minutes to enlarge both surface of the aluminum foil. Furthermore, chemical conversion process was performed on the aluminum foil to form dielectric oxide film on the surface of the enlarged surface layer. In the chemical conversion process, after chlorine attached in the AC etching process was removed using phosphoric acid aqueous solution, voltage was applied in aqueous solution of ammonium dihydrogenphosphate.

The carbon layer of the cathode body included carbon black as the carbon material. In detail, powder of carbon black, styrene butadiene rubber (SBR) as a binder, and sodium carboxymethyl cellulose (CMC-Na) aqueous solution as aqueous solution containing a dispersing agent were mixed and kneaded to produce a slurry.

This slurry was uniformly applied on the cathode foil. Next, the slurry was heated and dried to volatilize the solvent, and then, press processing was applied to the cathode body. In the press processing, the cathode body was sandwiched by a press roller, and press linear pressure of 5.38 kNcm⁻¹ was applied to fix the carbon layer on the cathode foil. The press linear pressure was applied using a press machine manufactured by TAKUMI GIKEN. The diameter of the press roller was 180 mm, the press processing width was 130 mm, and the cathode body was transported once at 3 m/min.

Furthermore, band-shaped aluminum foil was used as the anode foil. DC etching was performed on the aluminum foil to form enlarged surface layers formed by tunnel-shaped etching pits of the foil. In the DC etching process, a first process of forming pits and a second process of enlarging the pits were used, and in the first process, electrochemical etching process was performed on the aluminum foil by DC current in aqueous solution containing chlorine ions. The etching process in the first process was performed at current density of 400 mA/cm² for 1 minute. In the second process, electrochemical etching process was performed by DC current in aqueous solution containing nitrate ions to enlarge the pits formed in the aluminum foil after the first process. The etching process in the second process was performed at current density of 400 mA/cm² for 2 minutes.

After the enlarged surface layer was formed, the chemical conversion treatment to form the dielectric oxide film on the surface of the enlarged surface layer was performed. In detail, voltage of 650 V was applied in chemical conversion solution of boric acid of 4 percent by weigh at liquid temperature of 85° C.

The anode foil and the cathode body were each connected by ultrasonic to a tab-shaped lead terminal formed of aluminum. This anode foil and the cathode body was wound via a separator therebetween. A kraft-type separator was used as the separator. The wound body of the anode foil, the cathode body, and the separator was impregnated with the electrolytic solution. Ethylene glycol as the solvent and azelaic acid salt as the solute were added to prepare the electrolytic solution. Furthermore, paranitorbenzyl alcohol was added to the electrolytic solution as the nitro compound at 2 percent by weight relative to the total amount of the electrolytic solution.

In the sealing body, an external terminal was attached to a phenolic laminate. After impregnating the wound body with the electrolytic solution, a lead terminal drawn out from the wound body was connected to the external terminal of the sealing body. Then, the wound body and the sealing body were inserted into an outer casing formed of aluminum, and the outer casing was sealed by the sealing body. The outer casing had a cylindrical shape with 30 mm in diameter and 50 mm in height. After the sealing by the sealing body, aging process was performed to the electrolytic capacitor. In the aging process, voltage of 481 V was applied at normal temperature (30° C.) for 95 minutes. By this, the electrolytic capacitor according to the example 1 in cylindrical shape of 30 mm in diameter and 60 nm in height and with constant voltage of 450 V was produced.

Example 2

An electrolytic capacitor of the example 2 was produced for high voltage application in cylindrical shape of 30 mm in diameter and 60 nm in height and with constant voltage of 450 V. A cathode body in which the carbon layer had been formed by sputtering was used for the electrolytic capacitor of the example 2 The enlarged surface layer was not formed in the cathode foil, and the press processing was not performed in the formation process of the carbon layer. In addition, the electrolytic capacitors of the example 2 was produced by the same production method and under the same condition as that of the example 1, including the composition of the carbon layer formed on the cathode foil.

Comparative Example 1

An electrolytic capacitor of the comparative example 1 was produced for high voltage application in cylindrical shape of 30 mm in diameter and 60 nm in height and with constant voltage of 450 V. In the electrolytic capacitor of the comparative example 1, the enlarged surface layer was formed, but the carbon layer was not formed. Furthermore, the press processing was not performed. In addition, the electrolytic capacitors of the comparative examples 1 was produced by the same production method and under the same conditions as that of the example 1.

(Comparison of Configuration)

The same and different points among the electrolytic capacitors of the examples 1 and 2, and the comparative example 1 are indicated in the below table 1. Note that, in the table 1, the synthesized capacitance was calculated as if the capacitors of at the anode side and the cathode side were present in series in the electrolytic capacitor. That is, the synthesized capacitance can be obtained by dividing the product of the capacitance X at anode side per unit area and the capacitance Y at the cathode side per unit area by the sum of the capacitance X at anode side per unit area and the capacitance Y at the cathode side per unit area. The capacity appearance rate is the ratio of the synthesized capacitance relative to the capacitance at the anode side.

TABLE 1

| | Carbon Layer in Cathode Body | Capacitance X at Anode Side [F/cm²] | Capacitance Y at Cathode Side [F/cm²] | X:Y | Synthesized Capacitance [µF/cm²] | Capacity Appearance Rate [%] |
|---|---|---|---|---|---|---|
| Example 1 | Present | 0.6 | 1000 | 1:1666.7 | 0.60 | 99.9 |
| Example 2 | Present | 0.6 | 25 | 1:41.7 | 0.59 | 97.7 |
| Comparative Example 1 | Absent | 0.6 | 70 | 1:116.7 | 0.59 | 99.2 |

(Measurement Test of Generation Amount of Gas)

The generation amount of gas for the electrolytic capacitors of the examples 1 and 2, and the comparative example 1 was measured. High voltage of DC450 V was applied to each electrolytic capacitor under the temperature environment of 105° C., and the generation amount of gas was measured for every time elapsed. The generation amount of gas was measured by a swell amount ΔL of the outer casing of the electrolytic capacitor. Bottom of the electrolytic capacitor swelled in the height direction (direction along the line that connects the opening and the bottom of the outer casing) of the electrolytic capacitor due to the gas. The swell amount ΔL of the outer casing was the changed amount in height of the electrolytic capacitor by the swelling.

The measurement result of the generation amount of gas is shown in FIG. 1. FIG. 1 is a graph indicating the time difference of the swell amount ΔL of the electrolytic capacitors of the examples 1 and 2, and the comparative example 1. As illustrated in FIG. 1, the degree of change in the swell amount ΔL was the same among the examples 1 and 2, and the comparative example 1 within 250 to 500 hours had elapsed after voltage application. However, within 500 hours to 750 hours had elapsed after voltage application, only the electrolytic capacitor of the comparative example 1 swelled rapidly. The degree of change in the swell amount ΔL of the electrolytic capacitor of the examples 1 and 2 did not change between within 250 to 500 hours and 500 to 750 hours had elapsed after voltage application.

This result confirmed that following phenomena had occurred. That is, within 250 to 500 hours had elapsed after voltage application, the nitro compound bonding to hydrogen atoms was present and the generation of hydrogen gas was suppressed, even in the electrolytic capacitor of the comparative example 1. However, at about 500 hours after voltage application, all of the nitro compounds had been bonded to the hydrogen atoms and the nitro compound that can bond to hydrogen atoms had disappeared in the electrolytic capacitor of the comparative example 1. Therefore, the electrolytic capacitor of the comparative example 1 was not suppressed by the nitro compound, and the electrolytic capacitor of the comparative examples 1 rapidly swelled after 500 hours had elapsed after voltage application.

In contrast, since the electrolytic capacitors of the examples 1 and 2 included the cathode body in which the carbon layer had been formed on the cathode foil and the anode foil and the cathode body were adjusted to have the capacitance so that when the capacitance X of the anode foil per unit area was 1, the capacitance Y of the cathode body per the same unit area was 10 or more, the generation of hydrogen gas was suppressed. It is assumed that cathode reaction reducing oxygen dissolved in the electrolytic solution and reduction reaction of the nitro compound occurred at the same time in the electrolytic capacitors of the examples 1 and 2, and that many nitro compounds that can bond to hydrogen atoms were still remaining even after 500 hours elapsed after voltage application. Therefore, the electrolytic capacitors of the examples 1 and 2 did not swell after 500 hours had elapsed after voltage application. Accordingly, from the result of the examples 1 and 2, and the comparative example 1, it was observed that the generation of hydrogen gas was suppressed in the electrolytic capacitor of the examples 1 and 2.

Example 3

An electrolytic capacitor of the example 3 was produced. The lead terminal formed by aluminum line and metal line was used in the electrolytic capacitor of the example 3. In detail, the aluminum line was formed by a flat portion formed by crushing one end with round-bar shape by press processing and the like, and a round-bar portion on the other end that was not crushed, and a tip of the round-bar portion was connected to the metal line by arc-welding, etc. The flat portion is connected to each of the cathode body and the anode foil by various connection method. Furthermore, a rubber sealing body to which a through hole to insert the metal line had been formed was used. The metal line drawn out from the wound body was inserted into and integrated with the through hole of the sealing body, and the wound body and the sealing body were inserted into the outer casing formed of aluminum. The electrolytic capacitor of the example 3 was produced by the same configuration, same composition, same production method, and under the same conditions as that of the example 1 except that the electrolytic capacitor of the example 3 had the cylindrical shape with 16 mm in diameter and 50 mm in height, and the electrolytic capacitor of the example 3 was for high voltage application of constant voltage of 450 V.

Comparative Example 2

An electrolytic capacitor of the comparative example 2 was produced. The structure of the lead terminal and the sealing body of the electrolytic capacitor of the comparative example 2 was the same as that of the example 3. Furthermore, the electrolytic capacitor of the comparative example 2 was produced by the same configuration, same composition, same production method, and under the same conditions as those of the example 1 except for the capacitance Y at the cathode side of the cathode body and that the electrolytic capacitor of the comparative example 2 had the cylindrical shape with the same size as that of the example 3, and the electrolytic capacitor of the example 3 was for high voltage application of constant voltage of 450 V.

(Comparison of Configuration)

The same and different points between the electrolytic capacitors of the example 3 and the comparative example 2 are indicated in the below table 2. Note that, in the table 2, the synthesized capacitance was calculated as if the capacitors of at the anode side and the cathode side were present in series in the electrolytic capacitor. That is, the synthesized capacitance can be obtained by dividing the product of the capacitance X at anode side per unit area and the capacitance Y at the cathode side per unit area by the sum of the capacitance X at anode side per unit area and the capacitance Y at the cathode side per unit area. The capacity appearance rate is the ratio of the synthesized capacitance to the capacitance at the anode side.

TABLE 2

| | Carbon Layer in Cathode Body | Capacitance X at Anode Side [F/cm$^2$] | Capacitance Y at Cathode Side [F/cm$^2$] | X:Y | Synthesized Capacitance [µF/cm$^2$] | Capacity Appearance Rate [%] |
|---|---|---|---|---|---|---|
| Example 1 | Present | 0.6 | 1000 | 1:1666.7 | 0.60 | 99.9 |
| Comparative Example 2 | Absent | 0.6 | 124 | 1:206.7 | 0.60 | 99.5 |

(Measurement Test of Generation Amount of Gas)

The generation amount of gas for the electrolytic capacitors of the example 3 and comparative example 2 was measured. The application condition of high voltage and the measurement method and condition of the swell amount of the outer casing in the measurement test of the generation amount of gas were the same as those of the examples 1 and 2, and the comparative example 1.

Figure 2:
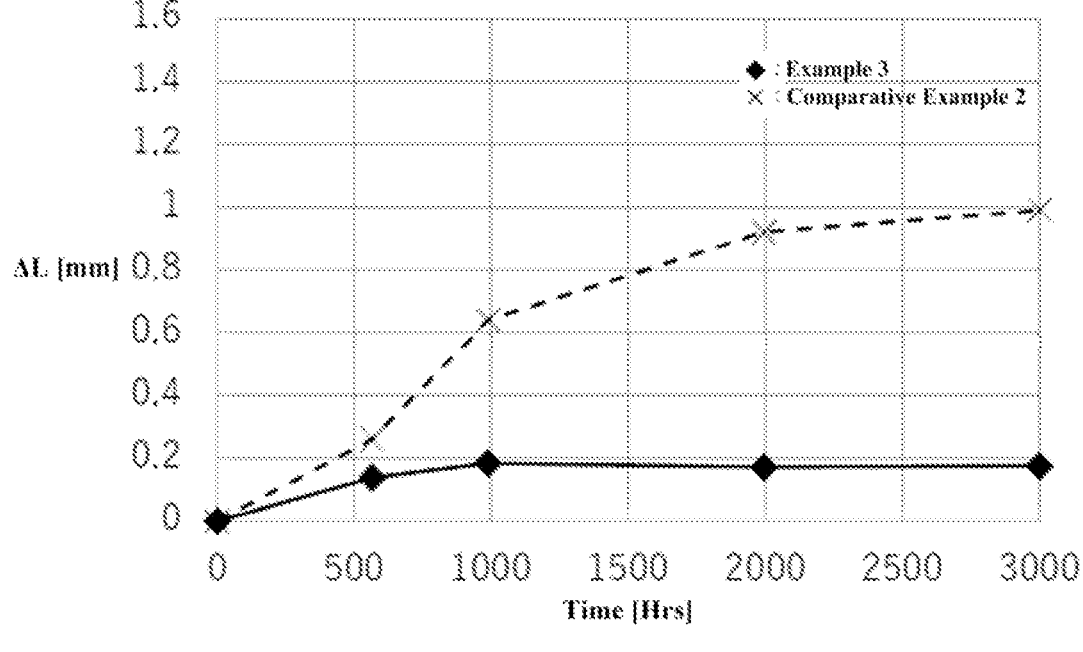
FIG. 2 is a graph indicating swell amount of electrolytic capacitors of the example 3 and the comparative example 2.

The measurement result of the generation amount of gas is shown in FIG. 2. FIG. 2 is a graph indicating the time difference of the swell amount ΔL of the electrolytic capacitors of the example 3 and the comparative example 2. As indicated in FIG. 2, the electrolytic capacitor of the comparative example 2 started to rapidly swell after 500 hours had elapsed after voltage application. In contrast, the swell amount ΔL of the electrolytic capacitor of the example 3 did not exceed 0.2 mm and hardly changed until 3000 hours had elapsed.

Also in the electrolytic capacitors of the example 3 and the comparative example 2, the nitro compound was all bonded in the electrolytic capacitor of the comparative example 2, indicating that the generation of hydrogen gas was not suppressed, while many nitro compounds that can bond to hydrogen atoms remained in the electrolytic capacitor of the example 3, indicating that the generation of hydrogen gas was suppressed. Thus, also from the result of the example 3 and the comparative example 2, it was confirmed that, since the electrolytic capacitors included the cathode body in which the carbon layer had been formed on the cathode foil and the anode foil and the cathode body were adjusted to have the capacitance so that when the capacitance X of the anode foil per unit area was 1, the capacitance Y of the cathode body per the same unit area was 10 or more, the generation of hydrogen gas was suppressed.

Examples 4 to 5

Example 4

An electrolytic capacitor of the example 4 was produced. The electrolytic capacitor of the example 4 was a laminated cell with the constant voltage of 200 V. The anode foil was chemically converted by applying voltage of 286 V. The anode foil and the cathode body were each connected by ultrasonic to a tab-shaped lead terminal formed of aluminum. Then, a separator that had been folded in zigzag was prepared, and the cathode body and the anode were alternately sandwiched by each fold to face each other via the separator to produce the laminate of the cathode body, anode foil, and the separator.

After impregnating the laminate with the electrolytic solution, the laminate was sealed in laminate material. The solvent of the electrolytic solution was ethylene glycol, and azelaic acid salt as the solute was added to said solvent. However, the nitro compound such as paranitrobenzyl alcohol was not added to the electrolytic solution. After the laminated cell was produced. Aging process was produced. In the aging process, voltage of 230 V was applied to the laminated cell at normal temperature (25° C.) for 120 minutes, and voltage of 230 V was applied to the laminated cell at temperature environment of 85° C. for 60 minutes.

The electrolytic capacitor of the example 4 was produced by the same configuration, same composition, same production method, and under the same conditions as those of the example 1 except for the capacitance X at the anode side of the anode foil and the capacitance Y at the cathode side of the cathode, and the electrolytic capacitor of the example 4 was for middle voltage application of constant voltage of 200 V.

Example 5

The electrolytic capacitor of the example 5 was produced as a laminated cell with the constant voltage of 200 V. The cathode body on which the carbon layer had been formed by sputtering was used for the electrolytic capacitor of the example 5. The enlarged surface layer was not formed in the cathode foil, and the press processing was not performed in the formation process of the carbon layer. In addition, the electrolytic capacitors of the example 5 was produced by the same production method and under the same condition as that of the example 4, including the composition of the carbon layer formed on the cathode foil.

Comparative Example 3

The electrolytic capacitor of the comparative example 3 was produced as a laminated cell with the constant voltage of 200 V. In the electrolytic capacitor of the comparative example 3, the enlarged surface layer was formed on the cathode foil, but the carbon layer was not formed. In addition, the electrolytic capacitors of the comparative examples 3 was produced by the same production method and under the same conditions as those of the example 4.

(Comparison of Configuration)

The same and different points among the electrolytic capacitors of the examples 4 and 5, and the comparative example 3 are indicated in the below table 3. Note that, in the table 3, the synthesized capacitance was calculated as if the capacitors of at the anode side and the cathode side were present in series in the electrolytic capacitor. That is, the synthesized capacitance can be obtained by dividing the product of the capacitance X at anode side per unit area and the capacitance Y at the cathode side per unit area by the sum of the capacitance X at anode side per unit area and the capacitance Y at the cathode side per unit area. The capacity appearance rate is the ratio of the synthesized capacitance relative to the capacitance at the anode side.

capacitance Y of the cathode body per the same unit area was 10 or more, the generation of hydrogen gas was suppressed.

Furthermore, the electrolytic capacitor of the example 5 in which the ratio of the capacitance X of the anode foil per unit area and the capacitance Y of the cathode body per unit area

TABLE 3

| | Carbon Layer in Cathode Body | Capacitance X at Anode Side [F/cm²] | Capacitance Y at Anode Side [F/cm²] | X:Y | Synthesized Capacitance [μF/cm²] | Capacity Appearance Rate [%] |
|---|---|---|---|---|---|---|
| Example 4 | Present | 1.77 | 1472 | 1:831.6 | 1.77 | 99.9 |
| Example 5 | Present | 1.77 | 25 | 1:14.1 | 1.65 | 93.4 |
| Comparative Example 3 | Absent | 1.77 | 40.5 | 1:22.9 | 1.70 | 95.8 |

As indicated in the table 3, the capacitance X at the anode side of the anode foil of the examples 4 and 5, and the comparative example 3 were 1.77 [μF/cm²]. The difference between the capacitance X at the anode side of the examples 4 and 5 and the comparative example 3, and the example 1 were because the dielectric oxide film was relatively thin for the voltage of the chemical conversion treatment was relatively low.

(Measurement Test of Generation Amount of Gas)

The generation amount of gas for the electrolytic capacitors of the examples 4 and the example 5, and the comparative example 3 was measured. Voltage of DC 214 V was applied to each electrolytic capacitor under the temperature environment of 105° C., and the generation amount of gas was measured for every time elapsed. The generation amount of gas was measured by a swell amount ΔV of the laminated cell. The swell amount ΔV of the laminated cell was measured by Archimedes method. That is, by measuring the weight increased when the laminated cell was immersed in water, the volume of the liquid removed by the laminated cell was measured.

Figure 3:
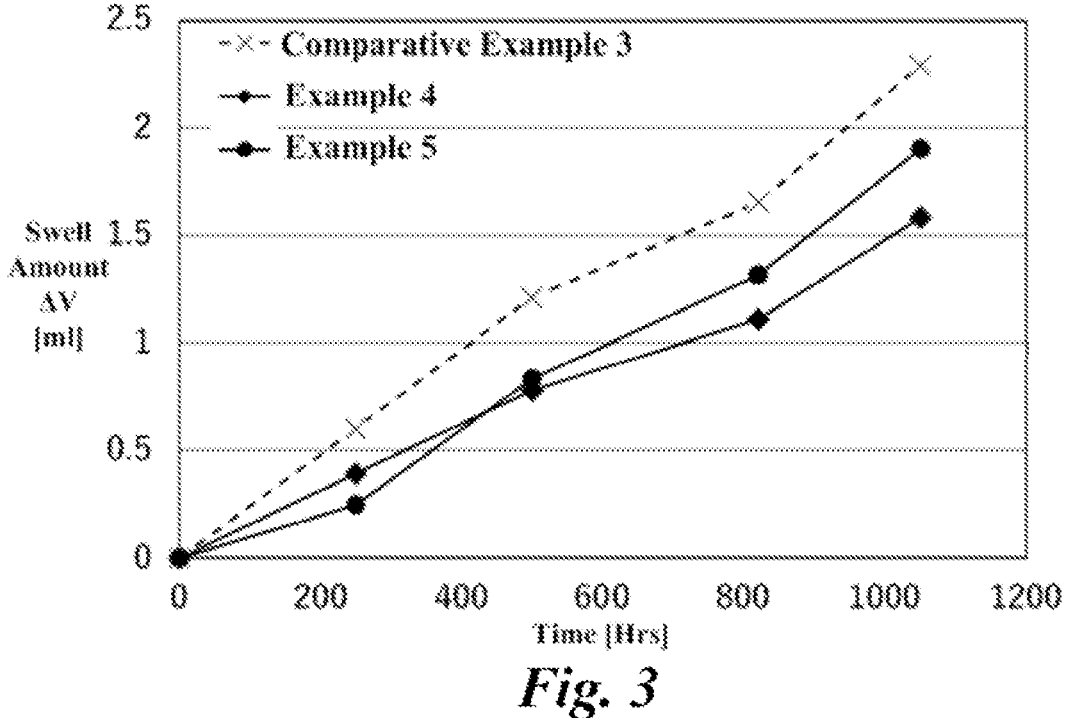
FIG. 3 is a graph indicating swell amount of electrolytic capacitors of the examples 4 and 5, and the comparative example 3.

The measurement result of the generation amount of gas is shown in FIG. 3. FIG. 3 is a graph indicating the time change in the swell amount ΔV of electrolytic capacitors of the examples 4 and 5, and the comparative example 3. As indicated in FIG. 3, it can be seen that the electrolytic capacitor of the comparative example 3 swelled 1.5 times more than the examples 4 and 5 after 500 hours had elapsed after voltage application. Furthermore, the examples 5 started to rapidly swell after 250 hours had elapsed. In contrast, although the swell amount ΔV of the electrolytic capacitor of the example 4 was increased, it can be seen that the electrolytic capacitor of the example 4 swelled slower than the electrolytic capacitors of the example 5 and the comparative example 3.

This result confirmed that following phenomena had occurred. That is, generation reaction of hydrogen gas along with the reduction reaction of protons occurred right after the test had been started in the electrolytic capacitor of the comparative example 3, and the swell amount ΔV of the electrolytic capacitor of the comparative example 3 per unit time from the start of voltage application was larger than those of the examples 4 and 5.

In contrast, it was observed that, since the electrolytic capacitors of the examples 4 and 5 included the cathode body in which the carbon layer had been formed on the cathode foil and the anode foil and the cathode body were adjusted to have the capacitance so that so that when the capacitance X of the anode foil per unit area was 1, the as same as that of the anode foil was 1:14 even when the example 5 included the cathode foil in which the carbon layer had been formed on the cathode foil, the swell amount ΔV after 500 hours had elapsed was larger than that of the electrolytic capacitor of the example 4 in which X:Y exceeds 1:14. Thus, also from the result of the example 3 and the comparative example 2, it was confirmed that, since the electrolytic capacitors included the cathode body in which the carbon layer had been formed on the cathode foil and the anode foil and the cathode body were adjusted to have the capacitance so that so that when the capacitance X of the anode foil per unit area was 1, the capacitance Y of the cathode body per the same unit area was more than 14, the generation of hydrogen gas was suppressed.

The invention claimed is:

1. An electrolytic capacitor used comprising: for a voltage application of 160 V or more,
   an anode foil including an enlarged surface layer formed on a surface of the anode foil and a dielectric oxide film with thickness of 200 nm or more formed on the enlarged surface layer; and
   a cathode body,
   wherein:
   the cathode body includes a cathode foil formed of a valve action metal and a carbon layer formed on the cathode foil, and
   the anode foil and the cathode body have capacitance so that when capacitance X of the anode foil per unit area is 1, ratio of capacitance Y of the cathode body per the same unit area is equal to or more than 10.

2. The electrolytic capacitor according to claim 1, wherein the anode foil and the cathode body have the capacitance so that when capacitance X of the anode foil per unit area is 1, the ratio of the capacitance Y of the cathode body per the same unit area is more than 14.

3. The electrolytic capacitor according to claim 1, wherein the anode foil has the capacitance X of 3.5 μF/cm².

4. The electrolytic capacitor according to claim 2, wherein the anode foil has the capacitance X of 3.5 μF/cm².

* * * * *